United States Patent [19]
Smith et al.

[11] Patent Number: 5,577,970
[45] Date of Patent: Nov. 26, 1996

[54] HYDRAULIC TENSIONER WITH A PRESSURE RELIEF VALVE

[75] Inventors: Franklin R. Smith, Cortland; Kevin B. Todd, Freeville, both of N.Y.

[73] Assignee: Borg-Warner Automotive, Inc., Sterling Heights, Mich.

[21] Appl. No.: 421,366

[22] Filed: Apr. 11, 1995

[51] Int. Cl.$^6$ .................................................. F16H 7/12
[52] U.S. Cl. .............................. 474/110; 474/135
[58] Field of Search .......................... 474/101, 110, 474/133, 135, 138

[56] References Cited

U.S. PATENT DOCUMENTS

| | | | |
|---|---|---|---|
| 4,507,103 | 3/1985 | Mittermeier | 474/110 |
| 4,708,696 | 11/1987 | Kimura et al. | 474/103 |
| 4,713,043 | 12/1987 | Biedermann | 474/111 |
| 4,874,352 | 10/1989 | Suzuki | 474/110 |
| 4,881,927 | 11/1989 | Suzuki | 474/110 |
| 5,116,284 | 5/1992 | Cho | 474/110 |
| 5,259,820 | 11/1993 | Mott | 474/110 |
| 5,277,664 | 1/1994 | Mott | 474/110 |
| 5,346,436 | 9/1994 | Hunter et al. | 474/110 |
| 5,352,159 | 10/1994 | Suzuki et al. | 474/110 |
| 5,366,415 | 11/1994 | Church et al. | 474/110 |
| 5,370,584 | 12/1994 | Todd | 474/110 |
| 5,383,813 | 1/1995 | Odai | 474/110 |

*Primary Examiner*—Roger J. Schoeppel
*Attorney, Agent, or Firm*—Willian Brinks Hofer et al.; Greg Dziegielewski

[57] ABSTRACT

A hydraulic tensioner having a plunger slidably fitted in a cavity in a housing and biased in a protruding direction by a spring and fluid. A check valve permits fluid to only flow into, and thereby protrude the plunger, but not out of the cavity. A pressure relief valve is mounted on the housing and is in communication with the cavity. The relief valve includes a flat spring member applying a preload against a reed valve to seal an exhaust passageway connecting to the cavity.

14 Claims, 2 Drawing Sheets

ന5,577,970

HYDRAULIC TENSIONER WITH A PRESSURE RELIEF VALVE

FIELD OF THE INVENTION

This invention relates to hydraulic tensioners, and particularly to a hydraulic tensioner having an extending plunger which is useful for constantly imparting and maintaining tension to wrapped power transmission devices such as chains, belts and the like. The invention is more particularly directed to a hydraulic tensioner having a coil spring and fluid actuated plunger in which a pressure relief valve is in communication with the tensioner hydraulic chamber.

BACKGROUND OF THE INVENTION

Tensioning devices, such as hydraulic tensioners, are used as a control device for a power transmission chain, or any similar power transmission devices, as the chain travels between a plurality of sprockets. Generally, it is important to impart and maintain a certain degree of tension to the chain to prevent noises, slippage, or the unmeshing of teeth in cases of a toothed chain. Prevention of such slippage is especially important in the case of a chain driven camshaft in an internal combustion engine because jumping of teeth will throw off the camshaft timing by several degrees, possibly rendering the engine inoperative or causing damage. However, in the harsh environment in which an internal combustion engine chain tension can vary between excessively high or low levels as a result of the wide variations in temperature and differences between the coefficients of linear expansion among the various parts of the engine, including the chain and the tensioner. Moreover, wear to the chain components, during prolonged use, can result in a decrease in the tension of the chain. It is also necessary to provide some measures to remove excessive tensioning forces on the tight side of the chain and to insure the necessary tension forces on the slack side of the chain. In addition, camshaft and crankshaft induced torsional vibrations cause belt tension to vary considerably. This tension variation results in chain elongation.

One example of a device used to control tension in a wrapped power transmission device is described in Biedermann, U.S. Pat. No. 4,713,043. Biedermann discloses a hydraulic ball-type check valve tensioner having a plunger slidably fitted into a chamber and biased by a spring in a protruding direction. The plunger extends against a lever arm that imparts tension to a chain according to the degree of slackening of the chain. A clearance, which is formed between the ball and seat of a check valve, permits the free flow of fluid therethrough into the chamber. Therefore, the hydraulic pressure from an external source, such as an oil pump or the like, flows into the chamber through passages formed in the housing, advancing the plunger easily by the combined efforts of the hydraulic pressure and the spring force.

On the other hand, when the plunger tends to move in a reverse direction, the ball is tightly contacted with the ball seat to restrict outflow of fluid from the chamber. Only a small clearance between the plunger and the housing wall permits some fluid to escape thereby allowing the plunger to retract. In such a fashion, the tensioner achieves a so-called no-return function, i.e., movements are easy in one direction but difficult in the reverse direction.

However, this no-return function may present difficulties in accommodating tension spikes or surges in the chain, belt or similar wrapped power transmission devices. When a timing device operates at its resonant frequency, the chain load increases significantly. The small clearance between the plunger and the housing wall is not sufficient to quickly release the hydraulic fluid in the chamber to accommodate the sudden overload of the chain.

One example of an attempt to alleviate this problem in a hydraulic tensioner is described in Suzuki, U.S. Pat. No. 4,881,927. Suzuki discloses a hydraulic ball-type check valve tensioner having a plunger slidably fitted into a chamber and biased by a spring in a protruding direction. This tensioner includes a relief valve having a sleeve slidably fitted in an auxiliary chamber in communication with the first chamber, with a spring biasing the sleeve into a depressed position to block a discharge part. Oil in the first chamber flows into the auxiliary chamber to force the sleeve against the biasing spring action to unblock the discharge port. Unfortunately, this relief valve may be slow to open and close due to high mass and subject to variable friction between the sleeve and auxiliary chamber wall. This may vary the pressure at which the relief valve operates.

Another example of an attempt to provide a hydraulic tensioner with a relief valve is described in Mittermeier, U.S. Pat. No. 4,507,103. Mittermeier discloses a hydraulic ball-type check valve tensioner having a plunger slidably fitted into a chamber and biased by a spring in a protruding direction. This tensioner includes a relief valve in a bore at the protruding end of the plunger. This relief valve is a spring-biased ball type valve with the spring set against a threaded throttle plug capping the bore. Oil in the first chamber forces open the ball, upon reaching a set high pressure, and flows into the bore, past the throttle plug threads to the atmosphere. Unfortunately, this relief valve may be slow to release large displacements of oil because of the restricted path past the threads and resultant back-pressure build up against the ball.

Accordingly, it is an object of the present invention to provide a tensioner for chain, belt or similar wrapped power transmission devices which can maintain a substantially constant tensioning force.

It is also an object of the present invention to provide a hydraulic tensioner with a pressure relief valve to allow the plunger to return when excessive loads are seen by the chain.

It is also a further object of the present invention to provide a hydraulic tensioner with a pressure relief valve that has a high spring rate and low mass to give a high frequency response.

SUMMARY OF THE INVENTION

The present invention is directed to a hydraulic chain tensioner having a pressure relief valve. According to one aspect of the present invention, there is provided a tensioner for a wrapped power transmission device, e.g. a chain linking at least two rotating members such as a pair of sprockets. A plunger, internally provided with a fluid chamber, slidably fits within a mounting cavity in a housing. A spring is provided to bias the plunger in a protruding direction towards the chain. A check valve having a variable orifice is provided between the housing and fluid chamber to permit fluid to flow into the fluid chamber of the plunger while blocking flow in the opposite direction. This check valve blocks outflows of fluid when a load is applied to the plunger by a chain, or other type of wrapped power transmission device, in a direction opposite to the biasing direction, thereby increasing the fluid pressure in the chamber. A pressure relief valve to release excess fluid pressure is in communication with the chamber. The relief valve includes a reed valve member being held against the chamber exhaust port by a flat spring member. Pressure in the chamber above a predetermined setting forces the reed valve away from the exhaust port to release fluid therethrough. Because the reed valve has a low mass, the relief valve has a high-frequency response.

In a preferred embodiment of the present invention, the spring member has a deformed tip that contacts the reed valve over the exhaust port. The deformed tip is configured to provide a predetermined preload spring force against the reed valve. The fixed ends of the reed valve and spring member are fastened together against the outside of the housing.

DETAILED DESCRIPTION OF THE PREFERRED EMBODIMENTS

Figure 1:
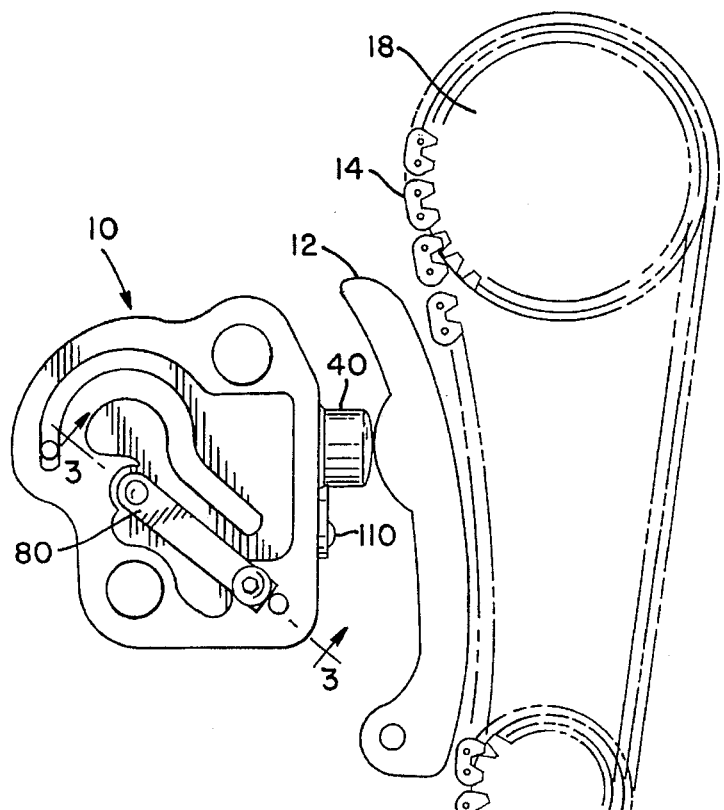
FIG. 1 is an elevation view of a hydraulic ball-type check valve tensioner with one embodiment of the relief valve external to the housing. The tensioner is depicted next to a wrapped power transmission device.

Turning now to the drawings, FIG. 1 illustrates a preferred embodiment of the hydraulic tensioner 10 incorporating the relief valve 80 of the present invention, as depicted next to a tensioner arm 12 applying tension to a chain 14, such as from an overhead cam timing drive. A typical overhead cam timing drive consists of a crank sprocket 16, a cam sprocket 18, a chain 14, a hydraulic tensioner 10, a tensioner arm 12 and a chain guide (not shown) opposite the tensioner arm. The chain guide is typically located on the "tight strand" or driving side, of the chain. The tensioner arm 12 and tensioner 10 are then located on the "slack strand" of the chain. The tensioner 10 includes a housing 20 with a chamber 22, or piston bore, a relief valve 80 in communication with the chamber, and a plunger 40, or piston, protruding from the housing to push a pivoting tensioner arm 12 against the chain to take up slack and keep the chain at some minimum tension value for good chain control.

Figure 2:
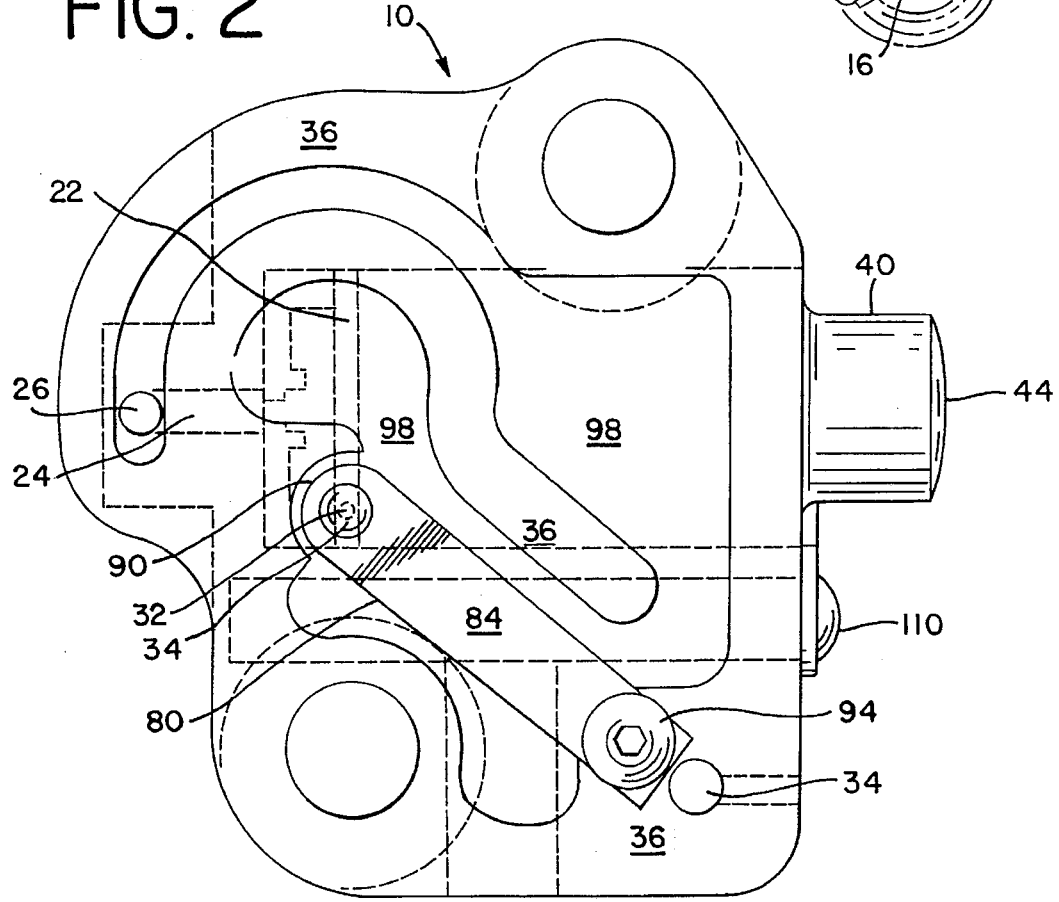
FIG. 2 is an elevation view of a hydraulic tensioner with another embodiment of the relief valve external to the housing.
Figure 3:
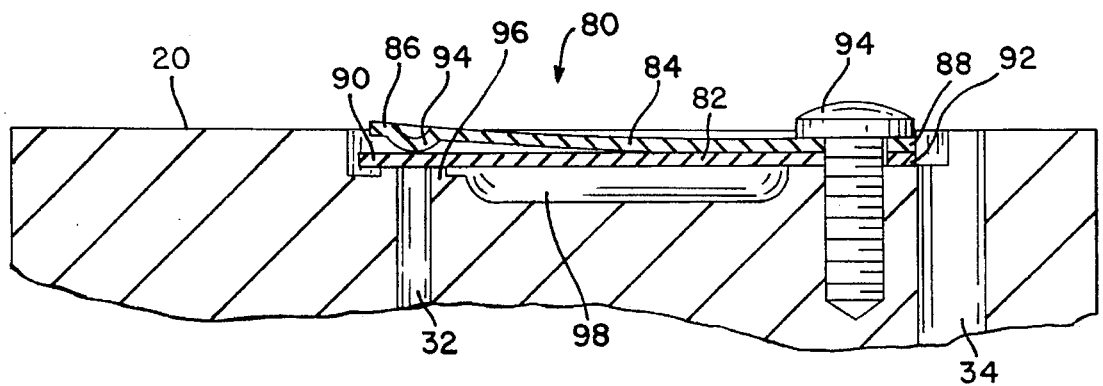
FIG. 3 is a sectional view of the relief valve of FIG. 1 taken along the lines 3—3.

Referring now to FIG. 3, the tensioner housing 20 includes a relief valve 80 mounted on the external surface. In this preferred embodiment, the relief valve 80 includes a reed valve member 82 and a flat spring member 84. The reed valve free end 90 covers the exhaust port 32, or conduit, that is in communication with the piston bore 22, as shown more clearly in FIGS. 2 and 4. However, as FIG. 3 clearly shows, the flat spring member 84 overlays the reed valve 82. The fixed end 88 of the spring member and the fixed end 92 of the reed valve are fastened together to the housing by a machine screw 94, or other suitable fastener. The free end 86 of the spring 84 includes a deformed tip 94 that protrudes to press against the free end 90 of the reed valve 82. Preferably, the tip 94 is a hemispherical protuberance that contacts the free end 90 of the reed valve centered over the exhaust port 32. The reed valve 82 seals against the valve seat 96 at the exhaust port outlet. Surrounding the valve seat 96 and below the reed valve and spring member, is the oil channel 98 that is preferably cut into the surface of the housing 20. This channel 98 conducts hydraulic fluid released from the exhaust port 32 back to the engine oil supply port 26.

Alternate embodiments of reed style valves are contemplated by the present invention for application as a relief valve on a hydraulic tensioner, but are not shown in the Figures. For example, the spring member may have various shapes. The spring may be formed with one or more curvatures that elastically deform to a flatter shape when fastened against the reed valve to supply the required pre-load spring force against the reed valve. Multiple springs may be stacked on top of each other overlaying the reed valve to provide a leaf spring-type variable load on the reed valve.

Likewise, the deformed tip may have various configurations. While the preferred embodiment shown in FIG. 3 is a hemispherical stamped protuberance, the tip may also be a protuberance made from additional material built-up to the side of the spring against the reed valve. Alternatively, the deformed tip may simply be the spring free end bent at right angle. Also, the deformed tip may be the free and with bent at some lesser angle or curved. The spring free end may have multiple bends to form a stepped end.

In addition, the seating of the relief valve may have various configurations. A separate disc may cover the exhaust port, with the disc being held in position by the reed valve and spring combination. Also, the spring member may have a portion that directly seals the exhaust port without the reed valve.

While the above list of alternative embodiments illustrates the varied range of the invention, it is not intended to be exhaustive. From the teachings herein, one skilled in the art may alter the configuration of the relief valve to best suit their needs, yet still be within the contemplated scope of the present invention.

Figure 4:
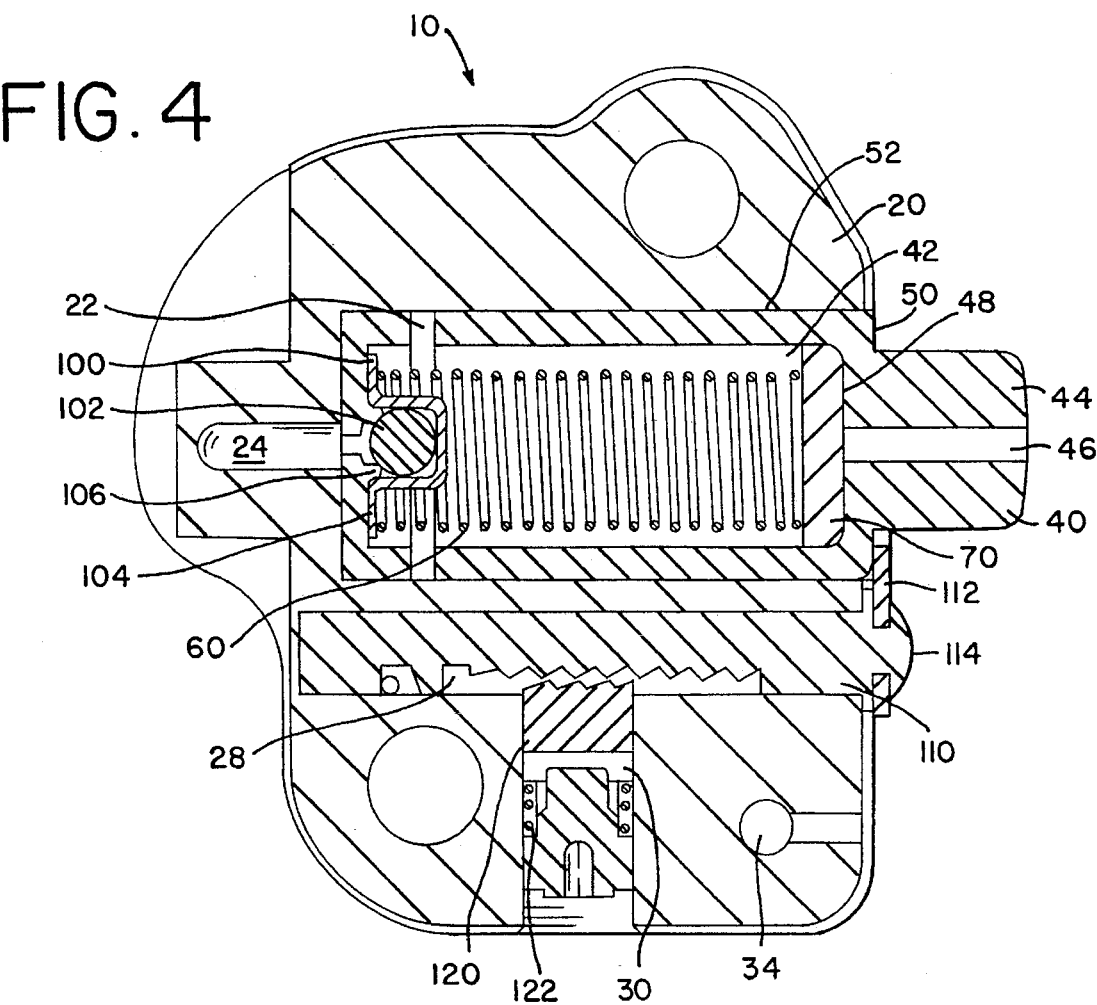
FIG. 4 is an illustration of the tensioner of FIG. 1 showing the internal components of the tensioner.

Referring now to FIG. 4, a sectional view illustrates the internal working components of the tensioner 10. The tensioner housing 20 includes a chamber 22 filled with fluid through an inlet passageway 24 from a pressure fluid source (not shown). The fluid source may be an oil pump or a reservoir. Preferably, the chamber 22 is a cylindrical bore. The chamber slidably receives a hollow plunger 40, preferably cylindrical, having an interior space 42 and an upper end 44 with an optional aperture 46. A cylindrical spring 60 fits in the interior space 42 and contacts the inside of the upper end 48 to bias the plunger 40 in a direction protruding from the housing 20 toward a wrapped power transmission device. If the aperture is present, a vent disk 70 is positioned in the interior space 42 against the inside of the upper end 48 of the plunger.

As noted above, the housing 20 is provided with a passageway 24 at the bottom of the chamber 22 to connect the chamber with a source of fluid pressure at the inlet port 26. The source of fluid pressure may be a reservoir, oil pump, or the like. In one embodiment of the tensioner, a check valve 100 is provided between the chamber and the passageway to permit fluid flow from the source of fluid pressure into the chamber while blocking fluid flow in the reverse direction. Preferably, the check valve 100 includes a ball 102 and a spring 104 biasing the ball toward a ball seat 106. In another embodiment, the check valve may be a variable orifice check valve as shown and described in U.S. Pat. No. 5,259,820 and U.S. Pat. No. 5,277,664 both of which are owned by the assignee of the present application and both of which are incorporated herein by reference.

In yet another embodiment, as shown in FIG. 4, the tensioner includes a rack and ratchet assembly to provide mechanical no-return limiter function. The housing 20 is provided with a longitudinal port 28 parallel to the chamber 22 to receive a rack 110 that is outwardly movable within the port 28. The rack 110 is associated with the plunger 40 so that as the plunger moves outward, the rack also moves outward. The ratchet 120 and spring 122 are in a lateral cavity 30 opening into the longitudinal port 28. The spring 122 biases the ratchet into meshing arrangement to provide the mechanical no-return limiter function. Alternative embodiments and the operation of this rack and ratchet assembly are described in U.S. Pat. No. 5,346,436 which is owned by the assignee of the present application and is incorporated herein by reference.

Referring now to FIG. 2, the relief valve 80 is shown fastened to the exterior of the housing 20 by a fastener 94. This figure shows the internal components of the tensioner in dashed lines underlying the exterior surface of the tensioner 10. The free end 90 of the reed valve blocks the exhaust port 32. The exhaust port is bored through the housing and is in communication with the chamber 22. Surrounding the exhaust port on the exterior of the housing, an oil channel 98 is provided. The channel is inset below the sealing surface of the tensioner housing to return hydraulic fluid released through the exhaust port 32 in a circuitous path to the supply port 26 communicating to the inlet passageway 24. One reason that the relief valve preferably exhausts to the oil supply is that the relief valves may have a back flow when closing. By exhausting to the oil supply instead of the atmosphere, it is expected that any back flow will be only oil and not air.

Preferably, the tensioner 10 is mounted to an engine block, or cylinder head, for example, with a gasket placed on the sealing surface 36 that fits flush against the mating surface of the engine block (not shown). The engine block acts as a mechanical stop to limit the maximum deflection of the reed valve and load spring, which also limits the maximum stress as well, regardless the hydraulic pressure acting on the reed valve and spring. Alternatively, mechanical stops may be affixed directly to the housing.

In operation, when the plunger 40 is being stressed inward by tightening of the chain 14, a very hard resistance can be noticed because the chamber 22 and interior space 42 is completely filled with an incompressible fluid. In the case of high pressures building up, there may be some leakage of fluid through the clearance between the plunger 40 and chamber wall 52. However, this leakage is minor and will not relieve rapid increases in pressure. When the pressure increases to a predetermined value, the force of the fluid acting against the area of the reed valve free end 90 covering the exhaust port 32 will push open the valve. This allows the oil to rapidly escape from the chamber 22, which lowers the internal pressure against the plunger 40, which in turn allows the plunger to recede into the chamber and lower the tension on the chain.

Some of the advantages of using a reed valve for this application is that it has a high spring rate and low mass which gives the relief valve a high frequency response. Another advantage is that a reed valve produces high flow for low deflections which also facilitates quick response. A further advantage of a reed valve is the simplicity of its construction for low cost production, yet ease of altering the relief valve set pressure. Simply by varying the exhaust port diameter, the flat spring member thickness, and spring tip deformation, a broad range of set pressures may be realized with minimal replacement of component parts.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A hydraulic tensioner for a wrapped power transmission device between two rotating members, comprising:

a housing with a fluid chamber, said chamber communicating with an external source of pressurized fluid, a plunger positioned within said chamber and capable of extending therefrom for bearing against a power transmission device to regulate tension between said rotating members, a spring member biasing said plunger in a direction extending from said chamber, a check valve positioned to allow the transfer of pressurized fluid from said source of pressurized fluid to said chamber and to block the transfer of fluid from said chamber to said source of pressurized fluid, a pressure relief valve having a conduit in fluid communication with said chamber to permit release of fluid from said chamber under specified pressure conditions, said pressure relief valve having a reed valve member and a flat spring member, said flat spring member being held against said reed valve member, said flat spring member being moveable away from said reed valve member to permit fluid communication through said pressure relief valve under said specified pressure conditions.

2. The tensioner of claim 1 wherein said reed valve member prevents fluid communication through an exhaust passage, said exhaust passage being in communication with said chamber and said source of pressurized fluid.

3. The tensioner of claim 1 wherein said flat spring member has a deformed tip that contacts said reed valve member.

4. The tensioner of claim 3 wherein said deformed tip is configured to provide a specified level of preload spring force of said flat spring member against said reed valve member.

5. The tensioner of claim 2 wherein said reed valve member has a first end and a second end, said flat spring valve member and said reed valve member are held at said reed valve member first end by a fastener member, said second end of said reed valve member covering said exhaust passage.

6. In a hydraulic tensioner having a housing with a fluid chamber, said chamber communicating with an external source of pressurized fluid, said tensioner having a plunger positioned within said chamber and biased in a direction extending therefrom by a spring member, said tensioner having a check valve positioned to allow the transfer of pressurized fluid from said source to said chamber, and said tensioner having a pressure relief valve to permit release of pressurized fluid from said chamber under specified pressure conditions, said pressure relief valve comprising:

a reed valve member and a flat spring member, said flat spring member being held against said reed valve member, said flat spring member being moveable away from said reed valve member to permit fluid communication from said fluid chamber through said pressure relief valve under specified pressure conditions, said reed valve member and said flat spring member being held at a first end by a fastener member.

7. A hydraulic chain tensioner comprising:

a housing having a fluid chamber;

a plunger slidably received within the fluid chamber;

a spring biasing the plunger in a direction extending from the fluid chamber;

a check valve to allow substantially only unidirectional transfer of fluid into the fluid chamber;

an exhaust passageway having an opening at the exterior of the housing and in communication with the fluid chamber;

a pressure relief valve covering said exhaust passageway opening, said relief valve having a flat spring member and a valve sealing member, said flat spring member contacting said valve sealing member, said valve sealing member contacting and sealing the exhaust passageway opening when the pressure in the fluid chamber is below a predetermined set value.

8. The tensioner of claim 7 wherein said sealing member is reed valve.

9. The tensioner of claim 7 wherein said sealing member is a disc.

10. The tensioner of claim 7 wherein said flat spring member is formed with at least one curvature, said spring member being elastically deformed to apply a preload tension against said valve sealing member.

11. The tensioner of claim 8 wherein said flat spring member has a free end that contacts a portion of the reed valve member covering the exhaust passageway opening.

12. The tensioner of claim 11 wherein said flat spring member free end has a hemispherical protuberance that contacts the reed valve.

13. The tensioner of claim 11 wherein said flat spring member free end has a stepped transition portion that contacts the reed valve.

14. The tensioner of claim 11 wherein said flat spring member free end has a thickened portion that contacts the reed valve.

* * * * *